United States Patent
Pavesio et al.

(10) Patent No.: US 11,407,266 B2
(45) Date of Patent: Aug. 9, 2022

(54) MOTOR-VEHICLE WHEEL SUPPORT UNIT HAVING A RECONFIGURABLE MODULAR STRUCTURE

(71) Applicant: FCA Italy S.p.A., Turin (IT)

(72) Inventors: Carlo Pavesio, Turin (IT); Andrea Stefanini, Turin (IT); Alessandro Messina, Turin (IT); Fabrizio Pastore, Turin (IT)

(73) Assignee: FCA Italy S.p.A., Turin (IT)

( * ) Notice: Subject to any disclaimer, the term of this patent is extended or adjusted under 35 U.S.C. 154(b) by 0 days.

(21) Appl. No.: 17/177,354

(22) Filed: Feb. 17, 2021

(65) Prior Publication Data

US 2021/0252930 A1   Aug. 19, 2021

(30) Foreign Application Priority Data

Feb. 18, 2020   (EP) .................................... 20157847

(51) Int. Cl.
*B60G 7/00*   (2006.01)

(52) U.S. Cl.
CPC .......... *B60G 7/001* (2013.01); *B60G 2204/43* (2013.01); *B60G 2204/61* (2013.01); *B60G 2500/30* (2013.01)

(58) Field of Classification Search
CPC ................ B60G 7/001; B60G 2204/43; B60G 2204/61; B60G 2500/30; B60G 2206/011; B60G 2206/50; B60G 3/06; B60G 21/051; B60G 2206/0114; B62D 7/18
See application file for complete search history.

(56) References Cited

U.S. PATENT DOCUMENTS

| | | | | | |
|---|---|---|---|---|---|
| 904,296 | A | * | 11/1908 | Bashford | 280/93.512 |
| 1,642,640 | A | * | 9/1927 | Bough | B62D 7/18 |
| | | | | | 280/93.512 |
| 2,952,473 | A | * | 9/1960 | Legge | B62B 5/049 |
| | | | | | 280/6.153 |
| 3,511,493 | A | * | 5/1970 | Burrell | B60G 11/113 |
| | | | | | 267/47 |
| 4,722,540 | A | * | 2/1988 | Kozyra | B60T 1/065 |
| | | | | | 280/124.136 |

(Continued)

OTHER PUBLICATIONS

European Search Report dated Jul. 27, 2020. 3 pages.

*Primary Examiner* — Paul N Dickson
*Assistant Examiner* — Timothy Wilhelm
(74) *Attorney, Agent, or Firm* — RMCK Law Group PLC

(57) ABSTRACT

A motor-vehicle wheel support unit includes a first base body provided with attachments for connection to arms of a motor-vehicle suspension, and a second body for rotatably supporting a wheel hub, which is separate with respect to the first base body and is secured to the first base body in one of two different selectable mounting positions, which correspond to two different vertical positions, with reference to a condition of use, of an axis of the wheel hub with respect to the first base body. In this manner, a height of the vehicle from the ground can be modified by simply mounting said second body on the first body in one or the other of the two mounting positions. In each of the two mounting positions, the second body is rotated by 180° around an axis parallel to the wheel hub axis with respect to the other mounting position.

3 Claims, 4 Drawing Sheets

(56) References Cited

U.S. PATENT DOCUMENTS

| | | | | |
|---|---|---|---|---|
| 5,263,731 A * | 11/1993 | Deutschel | B60G 3/06 | 280/124.145 |
| 5,961,135 A * | 10/1999 | Smock | B60G 7/008 | 180/227 |
| 6,109,632 A * | 8/2000 | Wei | B60G 3/20 | 280/124.136 |
| 6,152,466 A * | 11/2000 | Op Den Camp | B60G 15/07 | 280/93.512 |
| 6,322,153 B1 * | 11/2001 | Lund | B62K 25/04 | 152/40 |
| 6,368,012 B1 * | 4/2002 | St. Onge | B23P 19/102 | 403/368 |
| 6,416,136 B1 * | 7/2002 | Smith | B60B 35/003 | 301/124.1 |
| 6,474,672 B1 * | 11/2002 | Briscese | B60G 3/00 | 280/414.5 |
| 6,860,498 B2 * | 3/2005 | McGaughy | B60G 7/008 | 280/93.51 |
| 7,334,805 B2 * | 2/2008 | Nam | B60G 21/051 | 280/86.753 |
| 7,377,522 B2 * | 5/2008 | MacIsaac | B60G 3/01 | 280/5.506 |
| 7,540,570 B2 * | 6/2009 | Lund | B60B 9/005 | 152/40 |
| 7,651,105 B2 * | 1/2010 | Webster | B62D 7/18 | 280/93.512 |
| 7,762,372 B2 * | 7/2010 | LeBlanc, Sr | B60G 7/02 | 180/385 |
| 8,096,729 B2 * | 1/2012 | Galik | B60G 1/04 | 405/3 |
| 8,328,212 B1 * | 12/2012 | Dundon | B60G 3/20 | 280/124.138 |
| 8,596,906 B2 * | 12/2013 | Ebbenga | B63C 3/12 | 405/3 |
| 8,746,383 B2 * | 6/2014 | Basadzishvili | B60G 3/01 | 180/65.51 |
| 8,827,054 B2 * | 9/2014 | Chung | F16D 65/0075 | 188/73.39 |
| 9,340,087 B2 * | 5/2016 | Atkinson | B60D 1/155 | |
| 9,987,896 B2 * | 6/2018 | Schmidt | B60G 7/005 | |

\* cited by examiner

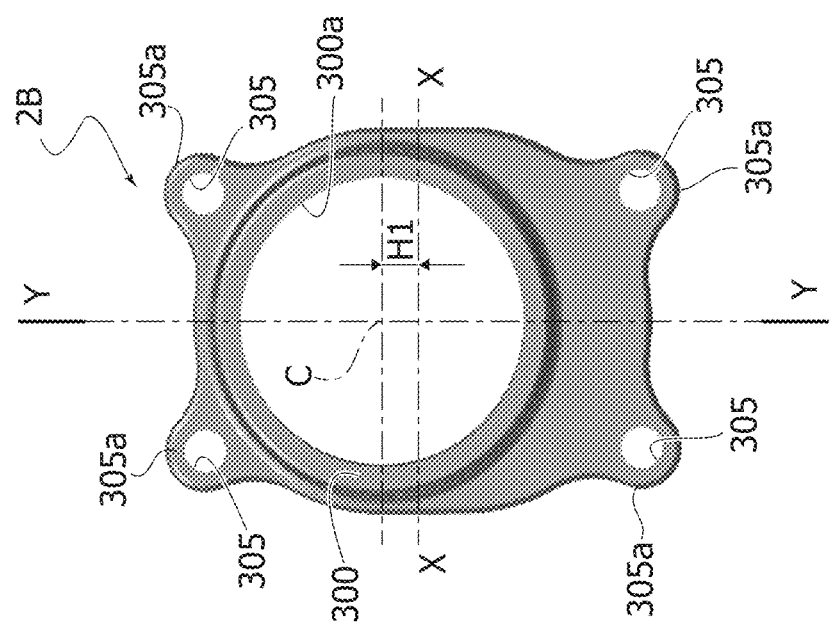
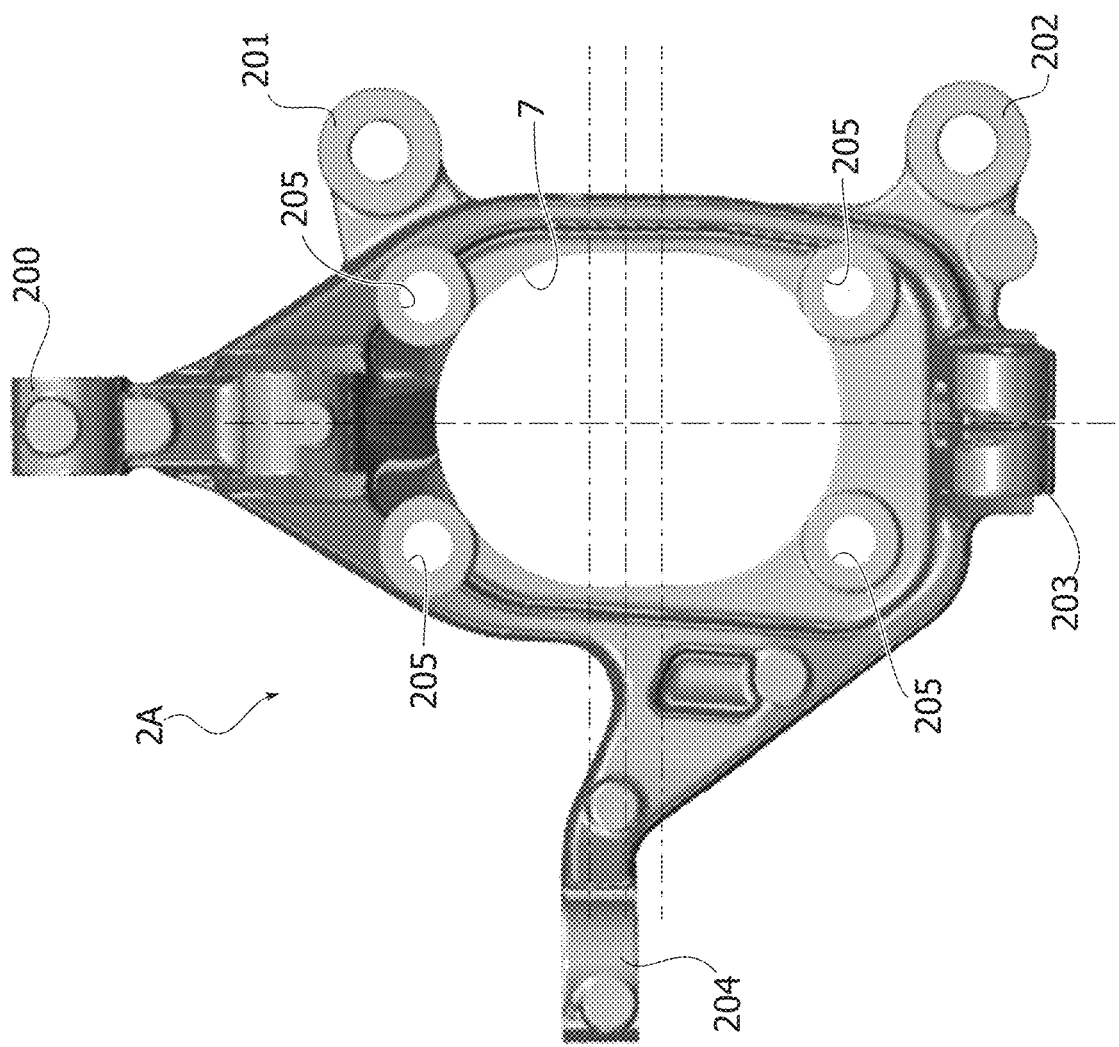
FIG. 2
FIG. 3

MOTOR-VEHICLE WHEEL SUPPORT UNIT HAVING A RECONFIGURABLE MODULAR STRUCTURE

CROSS-REFERENCE TO RELATED APPLICATION

This application claims priority to European Patent Application No. 20157847.3 filed Feb. 18, 2020. The disclosure of the above application is incorporated herein by reference in its entirety.

FIELD OF THE INVENTION

The present invention relates in general to motor-vehicle suspension systems and refers in particular to a wheel support unit for a suspension system.

PRIOR ART

In the production of motor-vehicles, the need may arise of producing a new motor-vehicle model using the same suspension system of an existing model, while adapting the suspension system so as to modify the height of the motor-vehicle from the ground. In general, this is obtained by modifying the configuration of the suspension system, with resulting costs due to the need of adapting the production equipment.

OBJECT OF THE INVENTION

The object of the present invention is that of proposing a simple and inexpensive solution for adapting an existing suspension system in order to obtain a different height of the vehicle from the ground.

SUMMARY OF THE INVENTION

In view of achieving this object, the invention provides a motor-vehicle wheel support unit, comprising a first base body provided with attachments for connection to motor-vehicle suspension arms and characterized in that said wheel support unit further comprises a second body, for rotatably supporting a wheel hub, which is separate with respect to the first base body and is secured to the first base body in one of two different selectable mounting positions, which correspond to two different vertical positions, with reference to the condition of use, of the axis of the wheel hub with respect to the first base body. According to the invention, the first body and the second body are configured so that in each of the two different selectable mounting positions, the second body is rotated by 180°, around an axis parallel to the axis of the wheel hub, with respect to the other mounting position.

The second body is secured to the first base body by means of any connection technique, such as by screws or by an interference-fit. In the case screws are adopted, the holes for engagement of the screws are arranged symmetrically both with respect to a median horizontal plane of the second body, and with respect to a median vertical plane of the second body, so as to enable mounting of the second body on the first body in any of said two mounting positions which are rotated relative to each other by 180° around an axis parallel to the axis of the wheel hub. Furthermore, the second body includes an annular cylindrical portion, for rotatably supporting the wheel hub, which has its axis vertically offset with respect to said median horizontal plane of the second body.

Due to the above indicated features, the wheel support unit according to the invention is able to solve, in an extremely simple and inexpensive manner, the problem of adapting the suspension system in order to modify the height of the vehicle from the ground.

In a preferred example, the first base body has a central aperture with a vertically elongated oval shape, for receiving therewithin said annular cylindrical portion of the second body, whatever is the selected mounting position of the second body with respect to the first body. In this preferred example, the above mentioned holes of the second body are four in number and are formed within respective projecting ears of the second body.

BRIEF DESCRIPTION OF THE DRAWINGS

Further features and advantages of the invention will become apparent from the description which follows with reference to the annexed drawings, given purely by way of non-limiting example, in which:

FIGS. 2, 3 are front views of the first base body and the second body supporting the wheel hub, which constitute the component parts of the wheel support unit according to the invention.

DETAILED DESCRIPTION OF ONE EMBODIMENT

Figure 1A:
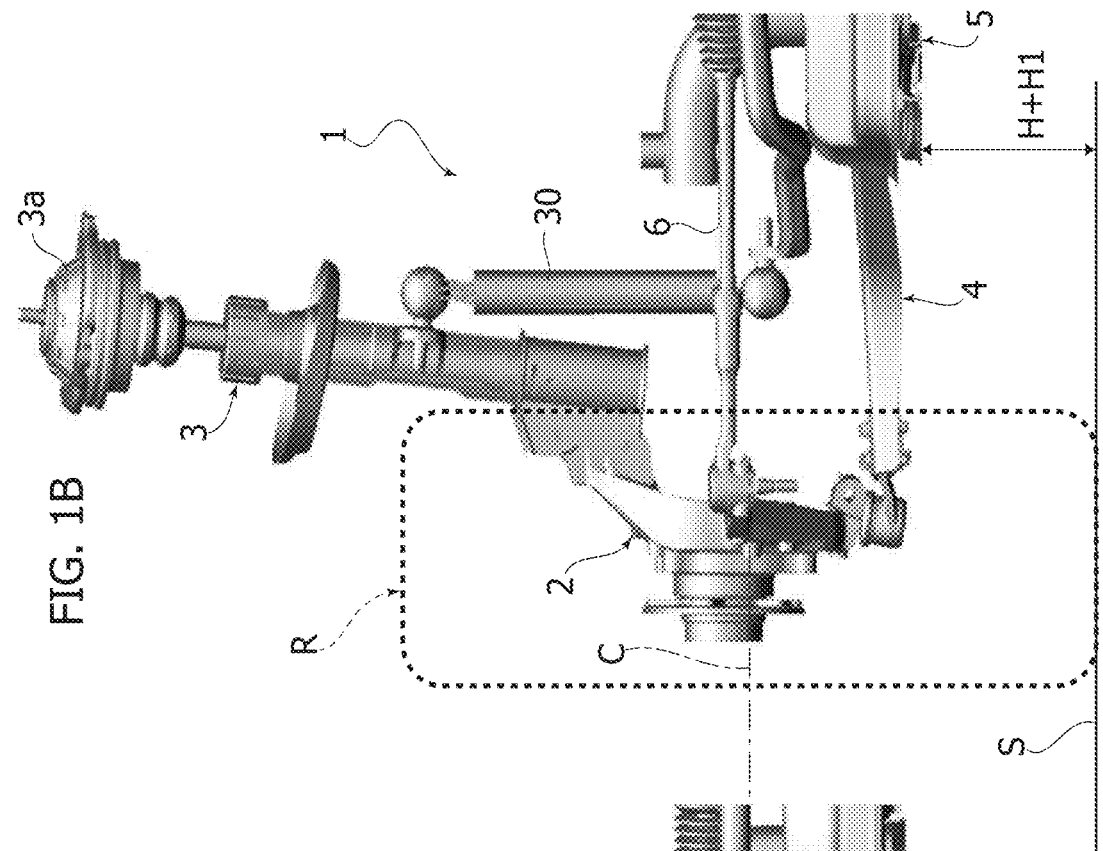
FIGS. 1A, 1B show a view, in a plane transversal with respect to the longitudinal direction of the vehicle, of one example of the suspension system provided with a wheel support unit according to the invention, in the two different configurations of the wheel support unit, which result in two different heights of the vehicle from the ground.
Figure 1B:
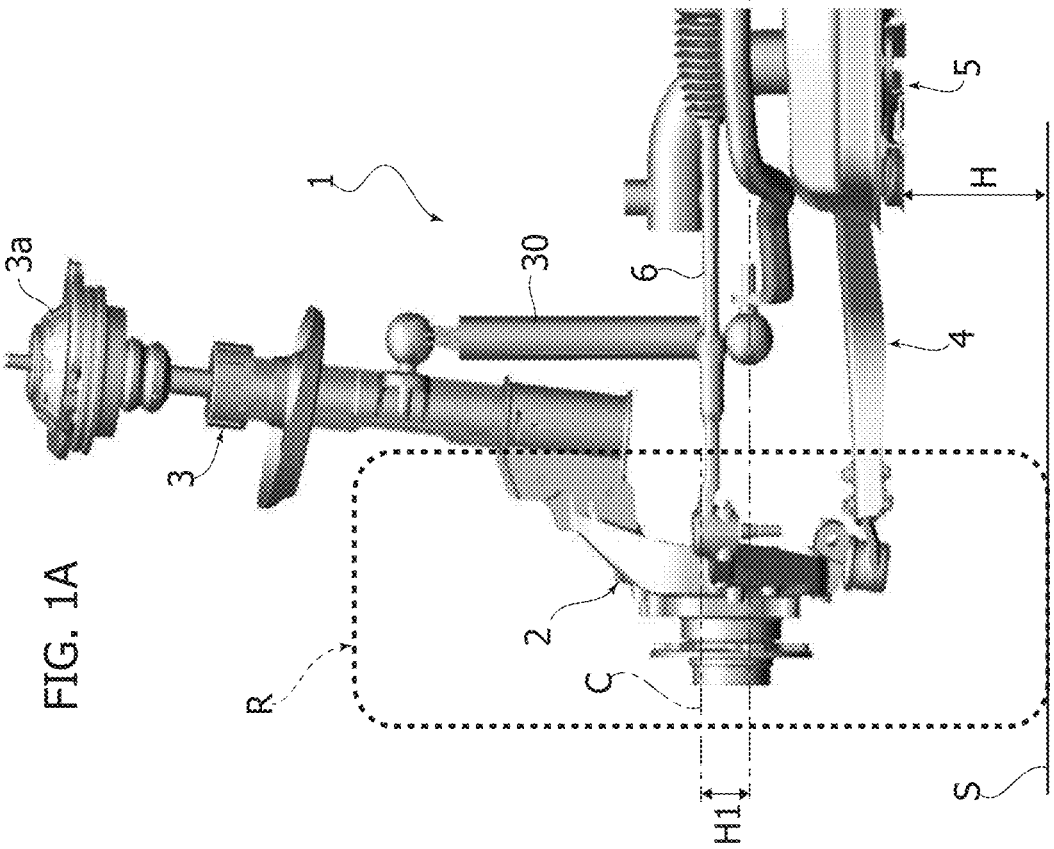

FIGS. 1A, 1B show, purely by way of example, a motor-vehicle suspension system to which the wheel support unit of the invention is applied. It is clearly apparent that this illustration is to be understood purely as an example, since the present invention is applicable to any type of suspension system.

In the illustrated example, the suspension system, generally designated by reference numeral 1, comprises a wheel support unit 2 provided with attachments for connection to a shock-absorber unit 3 and attachments for swivel joints for connection to arms 4 of the suspension (one of which is visible in the drawings) which on their turn are articulated to a frame 5 which supports the suspension system and is rigidly connected to the motor-vehicle body. The shock-absorber unit 3, to which a helical spring (not shown in the drawings) is associated, has its upper end connected by means of a swivel joint (not shown in the drawings) to a dome-shaped element 3a rigidly connected to the body (not shown) of the motor-vehicle. The shock-absorber unit 3 is also connected by means of an articulated link 30 to frame 5. Furthermore, the wheel support unit 2 is provided with an attachment for connection to a tie-rod 6 for controlling steering of the wheel.

As indicated in the foregoing, the above-described suspension system, which is of a type known per se, is described herein purely by way of an example of a suspension to which the wheel support unit according to the invention is applicable.

A basic feature of the invention lies in that the wheel support unit 2 comprises two separate components which are mutually mounted in a removable manner: a first base body 2A (FIG. 2) incorporating the attachments for connection to the elements of the suspension, and a second body 2B (FIG. 3) for supporting the wheel hub, which is configured to be connected to the first base body 2A.

With reference to FIG. 2, in the specific illustrated example, the first base body 2A has a large central apertures 7 having a vertically elongated oval shape (in the present description and in the following claims, the terms "vertical", "vertically" and "horizontal", "horizontally" are used with reference to the condition of use of the wheel support unit). The body 2A incorporates an upper attachment 200 for connection to the shock-absorber unit 3, attachments 201, 202, 203 for connection to articulated arms of the suspension, and a further attachment 204 for connection to the tie-rod 6 for actuating steering.

In the illustrated example, the base body 2A further has a plurality of threaded holes 205, for engagement of screws 10 (FIGS. 5A, 5B) for securing the second body 2B to the first body 2A. As already indicated, in place of screws, it is possible to adopt any other type of connection, such as a connection by interference-fit.

Figure 4:
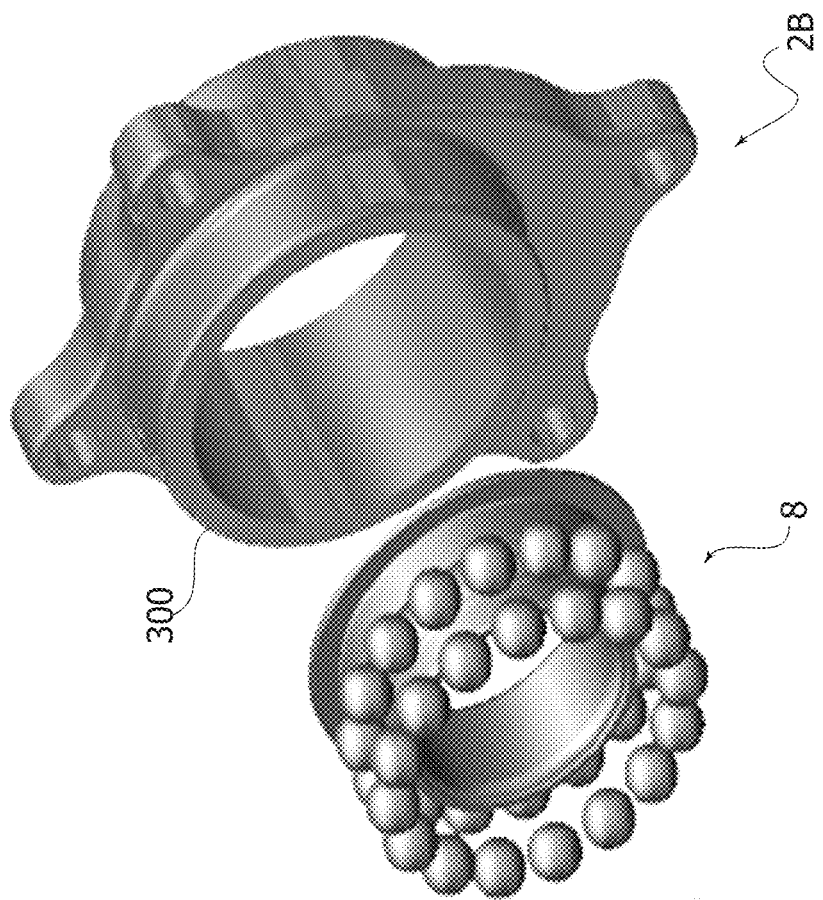
FIG. 4 is an exploded perspective view which shows the second body supporting the wheel hub, along with a wheel hub and the associated ball bearing.
Figure 4:
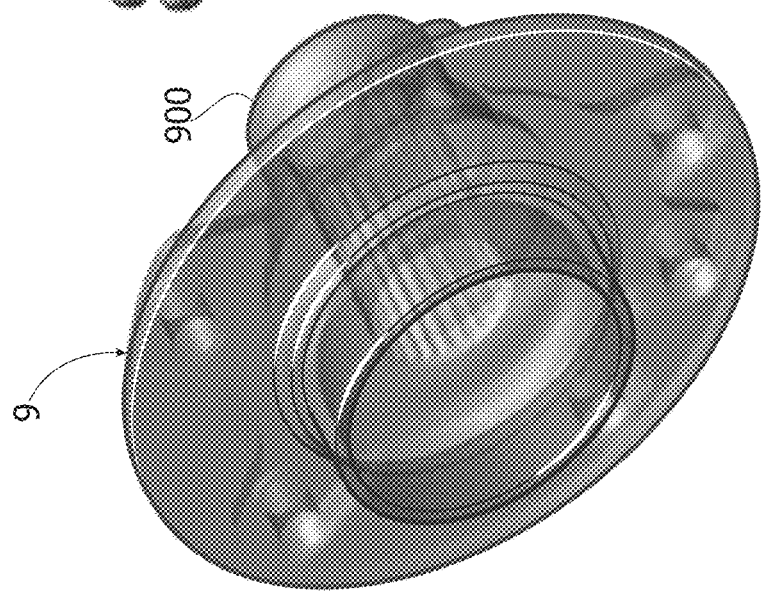

As shown in FIG. 4, the second body 2B has an annular cylindrical main portion 300 which rotatably supports, through a ball bearing 8, the tubular central shaft 900 of a wheel hub 9. The wheel hub 9 comprises a disc having threaded holes for engagement of screws for securing a wheel to the wheel hub 9 (the wheel is shown diagrammatically and designated by R in FIGS. 1A, 1B).

With reference to FIG. 3, the second body 2B for supporting the wheel hub has a plurality of holes 305 formed in ears 305a projecting from the body 2B. The holes 305 are to be traversed by securing screws which engage the threaded holes 205 of the first base body 2A. In the illustrated example, there are provided two pairs of holes 205 in the base body 2A and correspondingly there are provided two pairs of holes 305 in the second body 2B.

Whatever is the number of the formed holes, the holes 305 of the second body 2B are arranged symmetrically both with respect to a median horizontal plane X-X (see FIG. 3) of the second body 2B, and with respect to a median vertical plane Y-Y of the second body 2B. In this manner, the second body 2B can be mounted on the first body 2A (see FIGS. 2, 3) either by keeping the second body 2B with the orientation shown in FIG. 3, or by arranging the second body 2B with an orientation rotated by 180°, around an axis perpendicular to the plane of the figure, i.e. around an axis parallel to the axis of the wheel hub 9, with respect to the position shown in FIG. 3.

Also with reference to FIG. 3, the axis C of the annular cylindrical portion 300 is vertically offset with respect to the horizontal median plane X-X by a distance H1.

Therefore, depending upon whether the body 2B is mounted on the body 2A with the orientation shown in FIG. 3 or with an orientation rotated by 180° around an axis perpendicular to the plane of the figure, with respect to the position shown in FIG. 3, a different height is obtained of axis C, and hence of the axis of the wheel hub 9 with respect to the body 2A of the wheel support unit. This condition clearly appears from a comparison of FIGS. 5A, 5B which are front views, from the outer side, of the wheel support unit, corresponding to the two different configurations which the wheel support unit can assume (the wheel hub 9 has been shown as being transparent for better clarity of illustration).

Figure 5A:
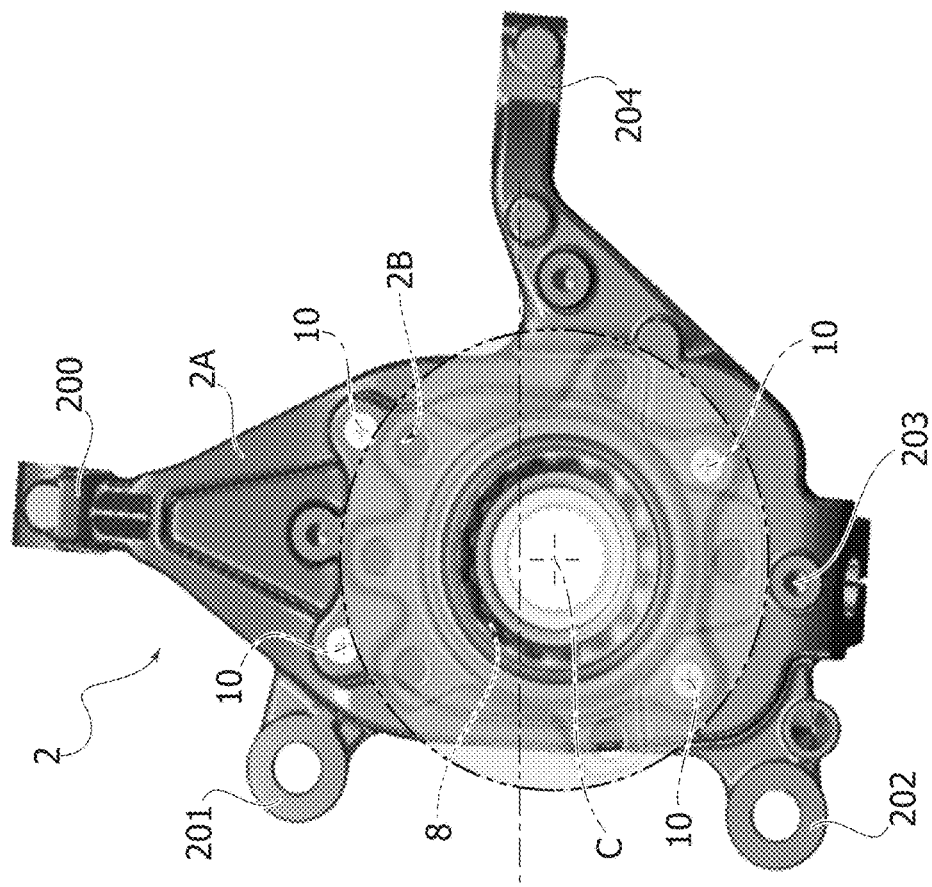
FIGS. 5A, 5B are two front views of the wheel support unit according to the invention in the two different configurations which it is able to assume.
Figure 5B:
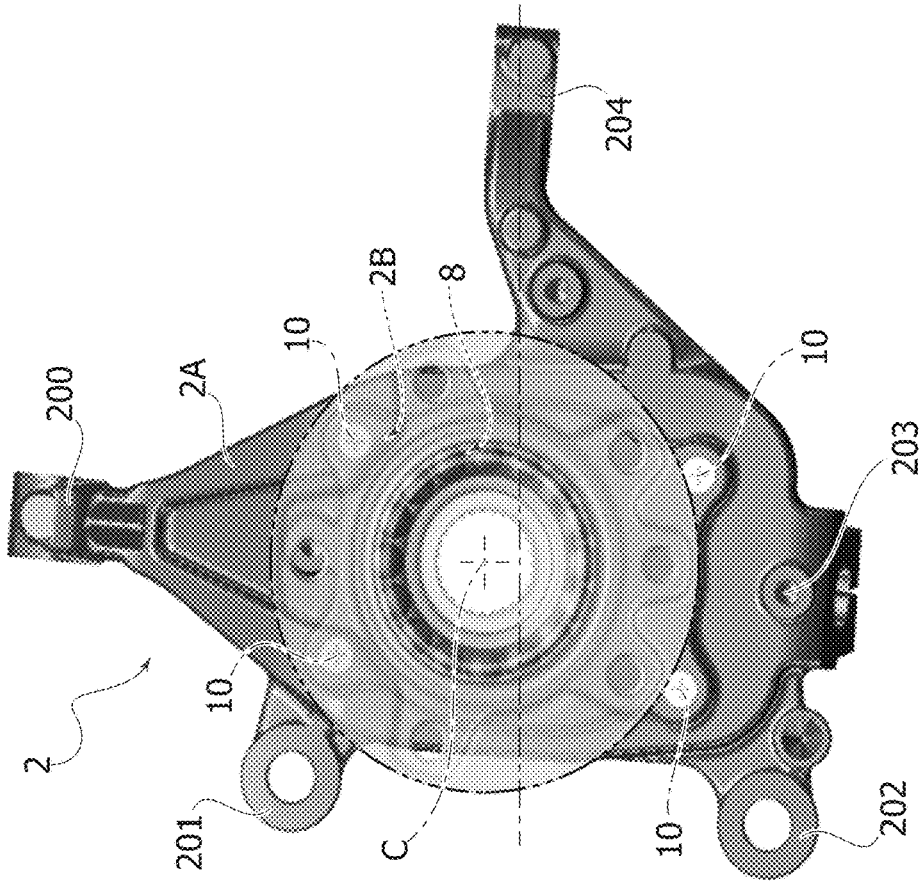

FIG. 5A shows a first configuration with the second body 2B secured to the first body 2A, by means of screws 10, with the body 2B oriented in the position shown in FIG. 3. FIG. 5B shows the other configuration, with the body 2B oriented in a position rotated by 180° around an axis perpendicular to the plane of the figure (i.e. around an axis parallel to the axis of the wheel hub) with respect to the position of FIG. 3.

The two configurations shown in FIGS. 5A, 5B give rise to the result of a different height of the vehicle from the ground. This condition is clearly shown in FIGS. 1A, 1B, in which the vertical displacement of the axis of the wheel hub with respect to the ground S is designated by H1, which results in the height of frame 5 from the ground shifting from the value H to the value H+H1 (in FIGS. 1A, 1B, for better clarity the suspension system has been shown always at the same height, whereas the position of the ground S has been changed).

As clearly apparent from the foregoing description, the wheel support unit according to the invention has a structure which is reconfigurable in a simple and quick manner in order to modify the height of the vehicle from the ground, without implying any change in the suspension system and hence without requiring a high cost of investment.

Naturally, while the principle of the invention remains the same, the details of construction and the embodiments may widely vary with respect to what has been described and illustrated purely by way of example, without departing from the scope of protection defined by the annexed claims.

It is clearly apparent in particular that the specific shape of the base body 2A and the body 2B for supporting the wheel hub may widely vary with respect to the example illustrated herein.

What is claimed is:

1. A motor-vehicle wheel support unit having a first base body provided with attachments for connection to arms of a motor-vehicle suspension, the wheel support unit comprising:

a second body for rotatably supporting a wheel hub, which is separate with respect to the first base body and is secured to the first base body in one of two different selectable mounting positions, which correspond to two different vertical positions, with reference to a condition of use, of the axis of the wheel hub, with respect to the first base body; and the first base body and the second body are configured so that in each of the two different selectable mounting positions, the second body is rotated by 180°, around an axis parallel to an axis of the wheel hub, with respect to the other different selectable mounting position;

wherein the second body for supporting the wheel hub has holes for engagement of screws for securing the second body to the first base body, these holes being arranged symmetrically both with respect to a median horizontal plane of the second body, and with respect to a median vertical plane of the second body, so as to enable the second body to be mounted on the first base body in any of said two different selectable mounting positions, which are rotated relative to each other by 180° around the axis parallel to the axis of the wheel hub;

wherein the second body includes an annular cylindrical portion for rotatably supporting the wheel hub, which has its axis vertically offset with respect to said median horizontal plane of the second body; and wherein the first base body has a central aperture with a vertically elongated oval shape, for receiving therewithin said annular cylindrical portion of the second body in whatever is the selected mounting position of the second body with respect to the first body.

2. The wheel support unit according to claim 1, wherein said holes of the second body are four in number and are formed in respective ears projecting from the second body.

3. The wheel support unit according to claim 1, wherein the second body for supporting the wheel hub is connected to the first base body by an interference-fit.

* * * * *